United States Patent [19]

Logman et al.

[11] Patent Number: 4,848,730
[45] Date of Patent: Jul. 18, 1989

[54] STRUCTURE FOR SEALING AND AFFIXING A COVER ON A VALVE BODY AND METHOD OF MANUFACTURE

[75] Inventors: Timothy M. Logman, Monticello; Joseph L. Daghe, Decatur; Dennis W. Humes, Decatur; Carl E. Floren, Decatur; Gary L. Bouc, Decatur, all of Ill.

[73] Assignee: Mueller Co., Decatur, Ill.

[21] Appl. No.: 213,148

[22] Filed: Jun. 29, 1988

[51] Int. Cl.⁴ .............................................. F16K 51/00
[52] U.S. Cl. .................................... 251/367; 137/315; 277/2
[58] Field of Search ................ 251/367, 329; 220/319; 277/206 R, 27, 2; 137/315

[56] References Cited

U.S. PATENT DOCUMENTS

| 3,110,471 | 11/1963 | Kuhles | 251/367 |
| 3,185,178 | 5/1965 | Bonnard | 251/367 |
| 3,963,214 | 6/1976 | Hackman et al. | 251/329 |
| 4,607,821 | 8/1986 | David | 251/367 |

Primary Examiner—A. Michael Chambers
Attorney, Agent, or Firm—Cushman, Darby & Cushman

[57] ABSTRACT

A valve body having an opening and a cover for closing the opening is provided with confronting sealing surfaces each having a circumferential recess of a specific shape to receive an elastic sealing ring; the sealing ring is provided with a tab which projects externally of the valve when assembled to indicate to proper positioning of the seal ring upon assembly; a process for manufacturing mold parts using a lost foam method includes replicating a valve part in styrene, forming a sand mold about the styrene and then pouring molten metal into the mold to destroy the styrene and fill the mold cavity thus formed.

17 Claims, 4 Drawing Sheets

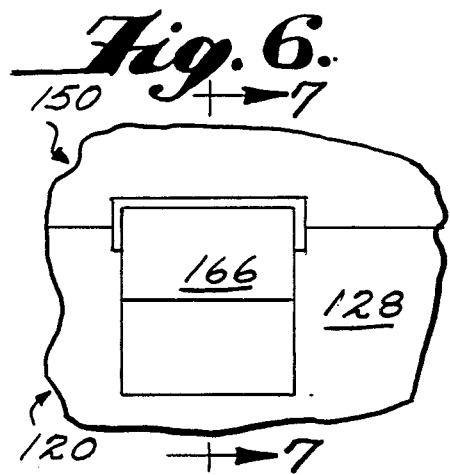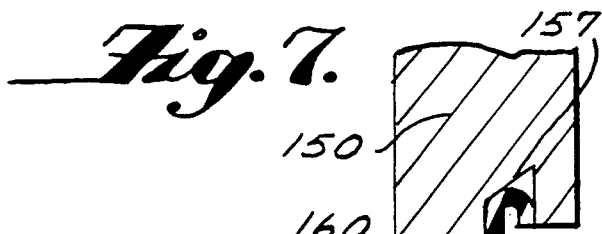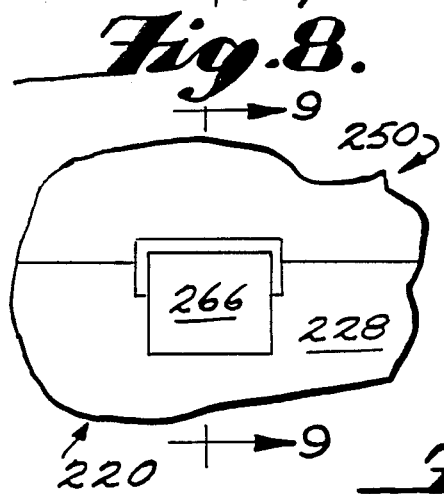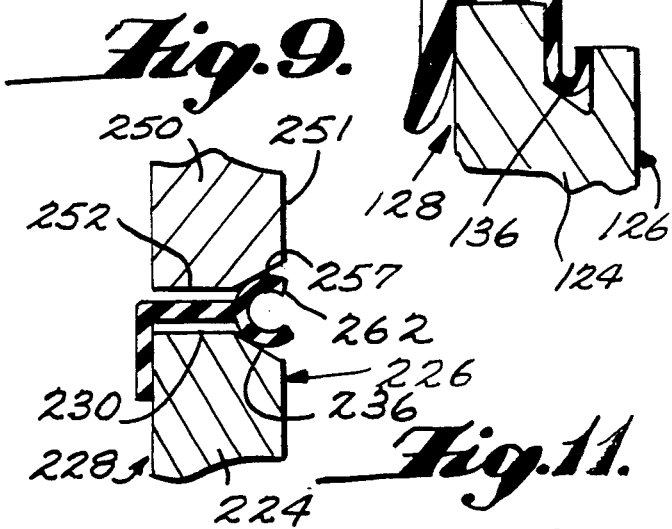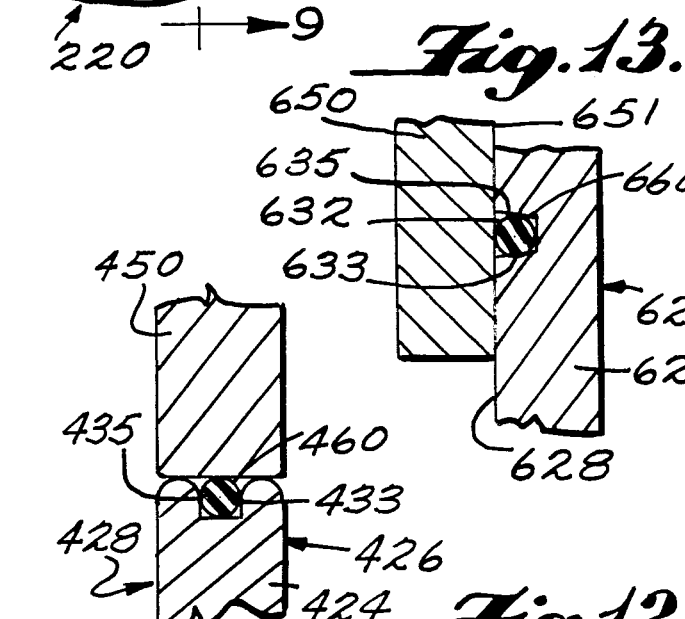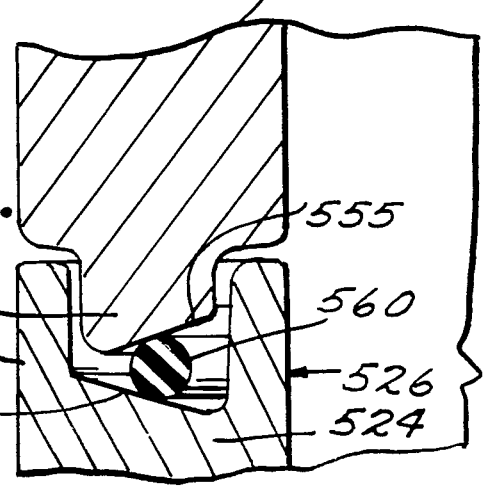

STRUCTURE FOR SEALING AND AFFIXING A COVER ON A VALVE BODY AND METHOD OF MANUFACTURE

BACKGROUND OF THE INVENTION

The present invention relates to valve having an improved structure for sealing and affixing a cover on a valve body. More specifically, this invention relates to an improved valve structure for assuring proper positioning of a seal between a cover and a valve body so that the seal will perform correctly over the life of the valve.

There have been proposed various structures for sealing a cover and a valve body without the use of gaskets and affixing a cover to a valve body without the use of nuts and bolts. The U.S. Pat. No. 4,431,163, discloses a valve body 2, valve cover 3, O-ring seal 24 and locking elements 28. U.S. Pat. No. 4,251,054 discloses a valve body 1, valve cover 2, sealing ring 17 with apron 18, and annular locking spring 15.

With the structures of the foregoing patents, there will be an undesirable uncertainty in assembling the valve in terms whether or not the seal member or members are properly positioned for long term use in these structures.

It is, accordingly an object of this invention to provide a definite indication of the proper positioning of the sealing member so that when the valve elements are assembled at a site, the user will be able to determine with a high degree of accuracy whether or not suitable sealing has been achieved.

The present invention is directed not only towards eliminating the deficiencies in the above-mentioned prior art, but also towards providing an improved valve body and method of manufacture thereof.

SUMMARY OF THE INVENTION

The present invention provides an improved valve structure which assures obtaining a long-life seal between a valve cover and valve body.

The first preferred embodiments include a seal having an elastic ring (possibly "O" or "C" shaped), a collar and a tab all integrally formed. The valve body upper portion has a surface, which can be a horizontal surface, having a ring receiving means disposed circumferentially in the first surface. The valve cover has a surface which also has a circumferential ring receiving means. The valve cover surface is in confrontational relationship with the valve body surface. When assembled, the elastic ring is disposed in compression in both of the valve body and valve cover ring receiving means and the collar, connected to the ring at one end and connected at a second end to a tab, extends between the valve body and valve cover surfaces. The tab works in combination with the collar, so that when the ring is properly seated for a long life seal, the tab is disposed at a desired location on the outside surface of the valve and, when the ring is not properly seated the tab will not be disposed in the desired outside valve surface location. The assembler will then know that the ring is not properly positioned and requires refitting.

Further, the valve body and valve cover ring receiving means may each have corresponding surfaces which converge towards the direction of the valve body outside wall so that pressure inside the valve can urge the seal ring towards the converging surfaces for a tighter sealing configuration.

In addition, the present invention includes means for affixing the valve body to the valve cover wherein the valve body upper portion has a plurality of semi-circular grooves which cooperate with hollow ears on the valve cover to form nearly complete holes which receive pins. The pins provide a rigid joint and the complete affixing structure provides strong corrosion resistant fastening and angle rotation prevention without the use of bolts and nuts.

Alternative preferred embodiments use conventional ring seals rather than seals with a ring, collar and tab. These structures include, however, valves in which the inside valve pressure urges the seals into a tight sealing configuration and eliminates the need for more costly gaskets. For example, in one alternative preferred embodiment the valve cover confrontational surface includes a projection surface which converges with the valve body ring receiving means corresponding surface towards the direction of the valve body vertical outside surface so that pressure inside the valve can urge the ring seal towards the converging surfaces for a tighter sealing configuration.

The present invention also includes an evaporative foam or lost foam molding process for making valve parts which permits parts to be molded to closer tolerances and smoother finishes. This method offers the possibility of less machining, lower costs, and a better fit between the cast body, cast cover, and the ring for a longer life seal.

Other objects, features, and characteristics of the present invention, as well as the methods and operation and functions of the related elements of the structure, and to the combination of parts and economies of manufacture, will become apparent upon consideration of the following description and claims with reference to the accompanying drawings.

BRIEF DESCRIPTION OF THE DRAWINGS

A more complete appreciation of the invention's many attendant advantages thereof will be readily obtained as the same becomes better understood y reference to the following detailed description when considered in connection with the accompanying drawings, in which:

FIG. 6 is a fragmentary side view of a seal tab of an alternative embodiment;

FIG. 7 is a fragmentary sectional view along section line 7—7 of FIG. 6 illustrating a tab, collar, and elongated C-ring with the ring being disposed between converging valve body and valve cover surfaces;

FIG. 8 is a fragmentary side view of a seal tab of an alternative embodiment;

FIG. 9 is a fragmentary sectional view along section line 9—9 of FIG. 8 illustrating a tab, collar, and C-ring with the ring being disposed between converging valve body and valve cover surfaces;

FIG. 10 is a fragmentary sectional view of an O-ring disposed tightly between side walls in a valve body horizontal surface;

FIG. 11 is a fragmentary sectional view of an O-ring disposed between a converging valve body and valve cover surface;

FIG. 12 is a fragmentary sectional view of an O-ring disposed between corresponding converging surfaces on a valve cover projection and on a valve body horizontal surface notch;

FIG. 13 is a fragmentary sectional view of an O-ring disposed tightly between side walls in a valve body vertical outside surface.

DESCRIPTION OF THE PREFERRED EMBODIMENTS

Figure 1:
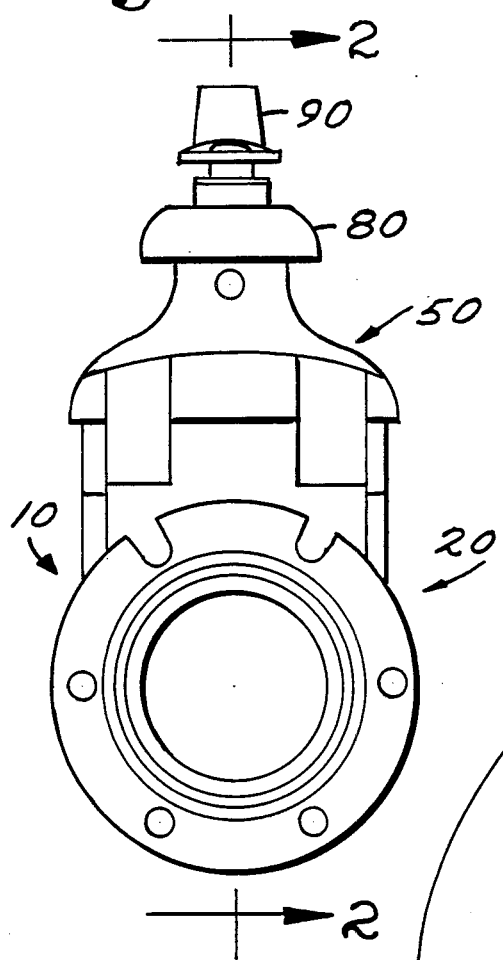
FIG. 1 is a side view of a valve of a preferred embodiment.
Figure 3:
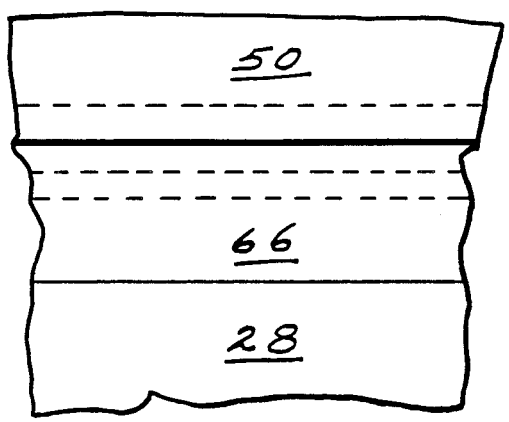
FIG. 3 is a fragmentary side view along section line 3—3 of FIG. 2 illustrating a seal tab located adjacent an outside wall of the valve.
Figure 2:
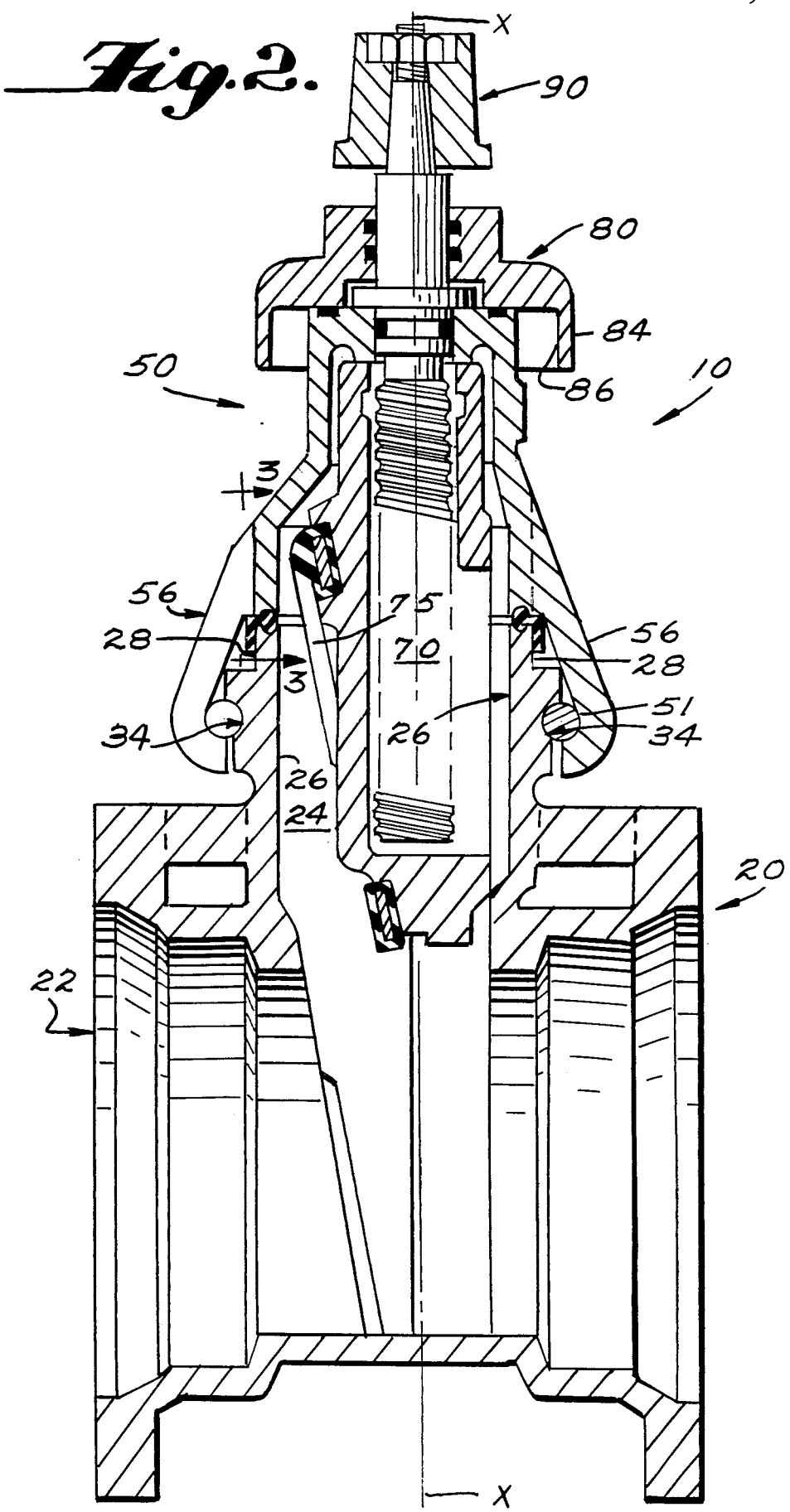
FIG. 2 is a sectional view along section line 2—2 of the valve of FIG. 1 illustrating a valve body, valve cover and a seal.

With reference to FIGS. 1 and 2, and in particular FIG. 2, the invention is shown applied to a valve 10 having a substantially vertical axis X—X comprising a valve body 20, a valve cover 50, and a screwthreaded operating rod 70 which extends through the cover and, upon its rotation, displaces in translation a closure member or disc 75 in the valve body 20. A stuffing box 80 engages the cover 50 in a breech lock connection without requiring nuts and bolts and a stainless steel pin (not shown) is placed through a hole in the stuffing box to prevent the stuffing box from turning during use and becoming disengaged. Further, above the stuffing box is a cap or the like 90 for turning the operating rod.

Figure 4:
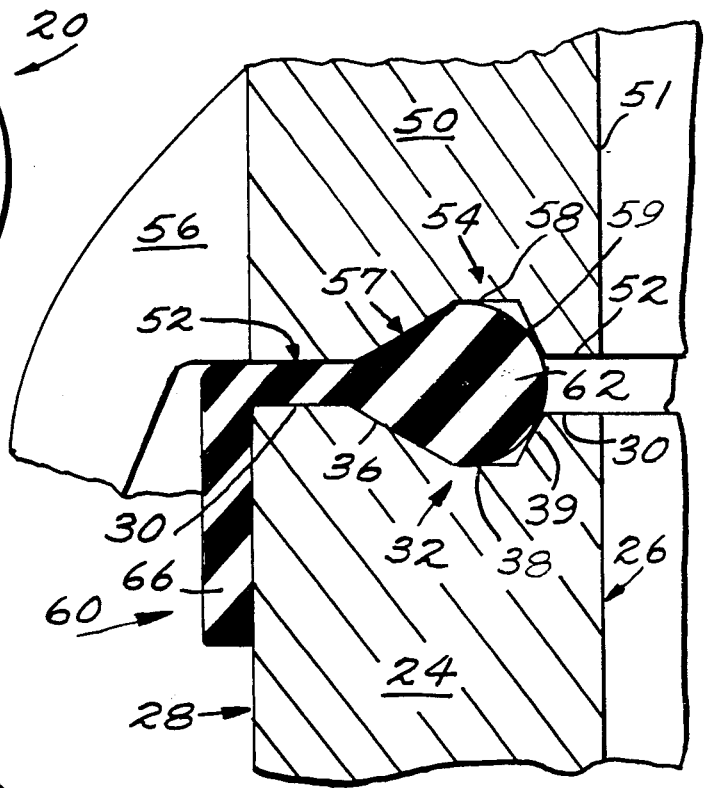
FIG. 4 is a fragmentary sectional view of a seal disposed in both the valve body and valve cover of FIG. 2.
Figure 5:
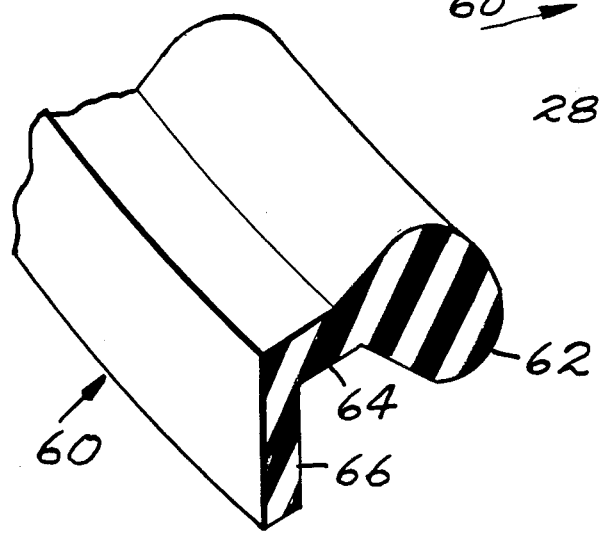
FIG. 5 is a fragmentary sectional view of the seal of FIGS. 2 and 4 illustrating a tab, collar, and ring.

Referring to FIGS. 2 and 4, the valve body 20 has a lower portion 22 and an upper portion 24. In the upper portion 24, the valve body receives a seal 52 and is affixed to the cover 50. The upper portion of the valve body includes a substantially vertical inside surface or wall 26 and a substantially vertical outside surface or wall 28 which is adjacent a top area of the upper portion 24. The upper portion 24 also includes an additional surface 30 which is preferably generally perpendicular to the axis X—X of the valve 10. This additional surface 30 has a notch, groove, recess, cut, or the like 32 for receiving an elastic ring seal 60.

The valve body upper portion 24 further includes at least two and preferably four semi-circular grooves 34 formed in an outwardly exposed surface of the upper portion of the valve body. These semi-circular grooves 34 are disposed below the valve body vertical outside surface 28 on opposite sides of the valve body.

Referring further to FIGS. 2 and 4, the valve cover 50 includes a surface 52, preferably generally perpendicular to the substantially vertical axis X—X of the valve, to be assembled in confrontational relationship to the valve body surface 30. This valve cover surface 52 has a notch, groove, recess, cut or the like 54, disposed circumferentially in this surface 52, for receiving the elastic ring.

To affix or lock the valve body and valve cover together, the valve cover of FIGS. 1-4 also includes at least two and preferably four curved ears 56. These ears 56, which are located on opposite sides of the valve cover, cooperate with the valve body semi-circular grooves 34. These valve cover ears in cooperation with the valve body grooves, define a plurality of spaced channels about the upper portion of the valve body covering approximately 270 to 315 of the circumference of the valve body. In each channel, a pin 51 is disposed or inserted in shear. The pins can be stainless steel or other materials, such as ductile iron to provide galvanic compatability. The pins provide a rigid locking joint which in combination with the valve cover ears and valve body grooves achieve strong corrosion resistant fastening and angle rotation prevention without the use of bolts and nuts or the need for valve part flanges for holding the bolts.

As shown in FIGS. 2-5, seal ring 60 is placed between the valve body 20 and valve cover 50. The seal includes a ring portion 62, a collar or web 64, and a tab 66. The elastic ring 62 cross-section can have an "O" shape, a spring-like "C" shape, or other suitable shape which can provide a seal within the structure shown.

The structure of the seal ring 60 is designed to provide an indicator of whether the seal ring is properly positioned. The elastic ring 62 is disposed circumferentially in compression in the valve cover ring receiving notches 32 and 54. The collar 64 extends between the cover and body from the seal ring to the tab. This collar can be integral with the ring 62 at one end and integral to the tab 66 at a second end. The tab 66 is disposed approximately adjacent an outside surface of the valve (for example, the valve body vertical outside surface). The tab and collar can be of a continuous flange type running continuously around the valve as in FIG. 3 or they can project from the seal ring at spaced locations. In the present invention the structure is designed for the tab to have a pre-specified location, as in FIGS. 3 and 4 which will indicate after assembly that the seal ring 60 is seated in its proper position. If the seal ring 60 is not properly positioned, the tab will not be in the planned location and the worker will then know the ring is not properly seated. For example, in this embodiment, the tab 66 should lie flat on the surface 28 thus indicating proper installation. Thus, the combination of placing the valve body ring receiving notch 32 on a different valve body surface than the vertical inside surface 26, having a valve cover ring receiving notch 54, and having a seal 60 with a collar and tab which positions the tab on an outside wall of the valve, provides an improved valve structure which substantially increases the reliability of seal installation and the probability of obtaining an effective seal for the required long life of the valve.

In addition, FIG. 4 shows the valve body and valve cover ring receiving notches 32 and 54 having corresponding surfaces 36 and 57 converging towards the direction of the valve body vertical outside wall 28 so that pressure inside the valve can urge the seal ring main body 62 towards the converging surfaces 36 and 57 for a tighter sealing configuration. FIG. 4 also shows a vertical inside surface 51 on the valve cover and surfaces 58 and 59 in the valve cover ring receiving notch 54 which correspond to surfaces 38 and 39 in the valve body ring receiving notch 32. These corresponding surfaces extend from the converging surfaces 36 and 57 to points approximately adjacent the edge between the inside surfaces 26 and 51 and the preferably horizontal surfaces 30 and 52. These converging surfaces 36 and 57 and corresponding surfaces 38, 39 and 58, 59 define the preferred notch shape 32 and 54 for receiving the seal ring mean body 62.

Assembly of the embodiment of FIGS. 1-5 is accomplished as follows. The operating rod 70 is placed in the valve cover 50 and the stuffing box 80 is then connected to the cover and around the top end of the operating rod. The disc 75 is screwed onto the bottom end of the rod 70. The seal ring 60 is placed in its notch 32 and then is pressed against the cover by a clamping tool (not shown). The body 62 is placed in compression between the valve body notch 32 and the valve cove notch 54 via this clamping tool and the locking pins are slid into the valve body grooves 34 and valve cover ears 56 to hold the main body 62 in a compressed position. If the seal is seated properly, the exposed seal tab 66 position should also be in the desired location as noted above. To further improve the overall seal, the valve cover and valve body ring receiving notch surfaces are preferably assembled as cast using the valve part manufacturing process described hereinafter.

FIGS. 6–13 illustrate fragmentary, sectional views of alternate embodiments. These alternatives all include modifications to the seal disposed between the valve cover and valve body and also include modifications to the valve cover or valve body ring receiving notch or the like. The last two digits of the elements designate them as similar to the corresponding two digit elements in FIGS. 1–5. In certain instances, therefore, three-digit elements will not be discussed, because they are identical to two-digit elements which have already been described.

In FIGS. 6 and 7, the seal 160 includes an elongated C-shaped ring 162 disposed against the valve body upper portion's 124 ring receiving notch converging surface 136 and the valve cover's 150 corresponding converging surface 157 so that the fluid pressure inside the valve will urge the elongated C-shaped ring 162 towards the converging surfaces 136 and 157 for a tighter sealing configuration.

FIGS. 8 and 9 illustrate a similar functioning alternative embodiment with the valve cover 250 converging surface 257 extending at an angle from a valve cover inside surface 251 to the valve cover surface 252. Also, the valve body upper portion 224 corresponding converging surface 236 extends at approximately the same angle from the valve body upper portion vertical inside surface 226 to the valve body surface 230.

FIGS. 10–13 illustrate four alternative embodiments having corresponding converging surfaces (FIGS. 11 and 12) as described above, or having valve body ring receiving notch surfaces substantially restricting seal ring movement (FIG. 10 and 13) to seat conventional "O" and "C" rings between the valve cover and valve body in a manner which reduces the likelihood of a seal being displaced during assembly or use. In FIG. 12, the valve cover includes a projection 553 having a surface 555 for insertion into a valve body upper portion 524 recess having converging surface 530 with both surfaces converging towards the valve body vertical outside wall 528 so that pressure inside the valve may urge the ring seal 560 towards these converging surfaces 530 and 555 for a tighter sealing configuration. In FIG. 11, a similar function is provided with valve body and valve cover notch converging surfaces 330 and 357.

FIGS. 10 and 13 illustrate valve body ring receiving notches which have surfaces, 433 and 435 in FIG. 10 and 633 and 35 in FIG. 13, which substantially prevent the seal rings 460, 60 from moving, in a horizontal direction in FIG. 10 or in a vertical direction in FIG. 13. In FIG. 13 the ring receiving notch 632 is in the vertical outside surface 628 of the valve body upper portion 624 and the valve cover vertical inside surface 651 is in confrontational relationship with the valve body upper portion vertical outside surface 628. Assembly of the alternative preferred embodiments FIGS. 6–13 is similar to the assembly steps described in relation to the embodiment of FIGS. 1–5.

Figure 14:
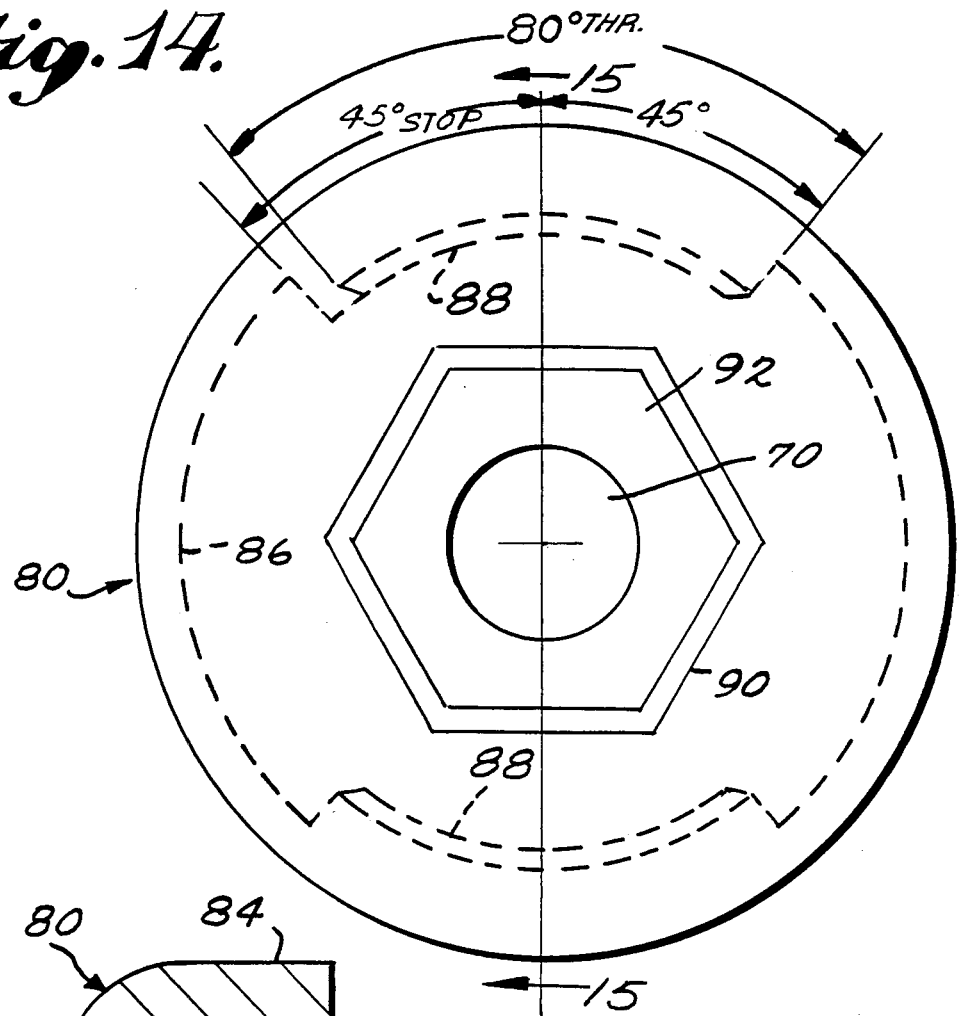
FIGS. 14 and 15 are top plan and sectional views, respectively of the stuffing box of this invention.
Figure 15:
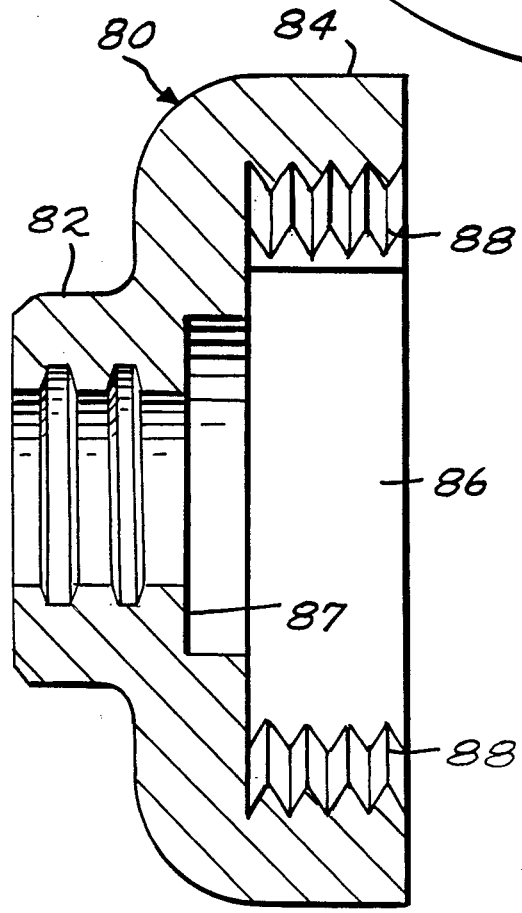

As shown in FIGS. 14 and 15, the stuffing box 80 is made with an upper neck portion 82 and a lower integral skirt portion 84 having a larger diameter than the neck 82. The neck is internally threaded to threadedly engage the threaded end of the operating rod 70 while the skirt portion 84 is formed with spaced threaded portions 88 separated by smooth wall sections 86. As will be apparent to those skilled in this art, the upper end of cover 50 will be threaded to cooperate with the threaded portions of the skirt 84 to enable a breach-lock form of attachment. A recess 87 is provided adjacent the inner end of the skirt 84 and will accomodate a circular flange on the operating rod 70 as shown in FIG. 2.

With this shape for the stuffing box 80, several advantages will be achieved both in the manufacture as well as assembly of the valve. In production, as this type of valve may be made in a wide range of sizes, lifting of the heavier sizes can be accomplished in a safe and effective manner by lifting devices such as hooks which will engage under the skirt 84 on the smooth wall portions 86 without damaging the threads. Also, angling of the suspended valve element can be readily accomplished to facilitate inspection, coating or the like. In assembly, of course, close inspection of the threading operation is permitted by the radial space provided by the enlarged skirt portion 84.

The present invention also includes an evaporative foam (or lost foam) molding process for manufacture of the cast parts to reduce machining, lower costs, and further improve the fit between the cast body, cast cover, and the ring for a longer life seal. This evaporative foam molding process involves replicating in polystyrene a valve part, such as a valve body or valve cover, to be cast, and coating the polystyrene with a fine sand mold wash on the inside and outside of the polystyrene valve part replica. The fine sand mold wash hardens and actually forms the mold. The coated polystyrene valve part replica is then surrounded by sand inside and outside. The sand is packed by vibration to support the mold wash pattern. Molten metal, preferably ductile cast iron, is then poured into the polystyrene valve part replica. The polystyrene replica melts, vaporizes, and passes through the mold as a gas. This process permits valve parts to be molded to closer tolerances and smoother finishes. Using ductile cast iron in this process provides stronger and more rigid iron than gray iron and thus permits thinner, 30%–40% weight reduced castings.

By producing surfaces which formerly required machining but are now ready to be assembled substantially as cast, valve parts can be covered with a protective coating immediately after casting whereas, in the past, delays in waiting for machining often permitted surfaces to become contaminated so that a second cleaning operation was needed.

While the invention has been described in connection with what is presently considered to be the most practical and preferred embodiments, it is to be understood that the invention is not to be limited to the disclosed embodiments, but on the contrary, is intended to cover various modifications included within the spirit and scope of the claims.

What is claimed is:

1. A valve having a longitudinal axis comprising:
a valve body including a first portion having an opening and a second portion, said second portion including:
an inside surface;
an outside surface joining said inside surface at an edge engaging said first portion adjacent said opening; and
said first portion having a first surface having means, disposed circumferentially in said first surface, for receiving a portion of an elastic seal means;
said second portion comprising a valve cover for closing said opening and including said edge, said edge having a second surface in confrontational relationship with said first surface, to define recess means, disposed circumferentially of said opening, for receiving an elastic seal means; and seal means, including:
an elastic seal ring disposed in compression in said recess means;
a collar having first and second ends and connected at a first end to said ring; and
indicator means in the form of a tab connected to said second end of said collar and disposed approximately adjacent said outside surface of said valve so that, in combination with said collar, there is provided an indicator of whether said ring is properly positioned; and
means for affixing said valve body to said valve cover.

2. A valve as in claim 1, wherein said tab is disposed to lie flat against said valve body outside surface.

3. A valve as in claim 1, wherein said first and second surfaces are generally in a parallel relationship to the longitudinal axis of the valve.

4. A valve as in claim 1, wherein recess means include third corresponding surfaces converging towards the direction of said outside surface so that pressure inside said valve can urge said seal ring towards said corresponding converging surfaces.

5. A valve as in claim 4, wherein said ring is an O-ring.

6. A valve as in claim 4, wherein said ring is a C-shaped ring.

7. A valve as in claim 4, wherein said corresponding converging third surfaces of each of said valve body and valve cover define one of a plurality of surfaces in both said valve body and recess means.

8. A valve as in claim 7, wherein
said valve cover further comprises a planar inside surface; and
each of said plurality of surfaces in each f said valve body and recess means further comprise:
corresponding substantially parallel fourth surfaces, and
corresponding fifth surfaces converging towards the direction of said inside surfaces; and
said corresponding fourth and fifth surfaces extending from the corresponding third surfaces to points approximately adjacent the edge between the inside surfaces and the first and second surfaces of the valve body and cover.

9. A valve as in claim 7, wherein said ring is an elongated C-shaped ring disposed against said corresponding third surfaces.

10. A valve as in claim 4, wherein said valve cover further comprises an inside surface;
said converging third surface of said recess means extending from said valve cover planar inside surface to said second surface; and
said converging third surface of said valve body recess means extending from said valve body second portion parallel to said inside surface to said first surface.

11. A valve as in claim 1, wherein said elastic seal ring is integrally formed.

12. A valve as in claim 1, wherein:
said valve body first portion further comprises a plurality of semi-circular grooves formed in an outwardly exposed surface of said valve body and spaced from said opening;
said valve cover further comprises a plurality of means, located on a the exterior of said cover, for cooperating with said plurality of semi-circular grooves of said first portion; and
said means for affixing said valve body to said valve cover further comprises pins with each pin disposed in one of said valve body semi-circular grooves and one of said valve cover cooperating means.

13. A valve as in claim 1, wherein said valve body recess means further comprises surfaces which substantially prevent said ring seal from moving in a horizontal direction relative to the substantially vertical axis of the valve.

14. A valve as in claim 13, wherein
said valve cover second surface further comprises means for receiving an elastic ring, and
wherein each of said valve body and recess means include third corresponding surfaces converging towards the direction of said valve body vertical outside surface so that pressure inside said valve can urge said ring seal towards said converging surfaces.

15. A valve as in claim 13, wherein
said valve cover second surface further comprises a projection; and
each of said valve body ring receiving means and said valve cover projection include third corresponding surfaces converging towards the direction of said valve body outside surface so that pressure inside said valve can urge said ring seal towards said converging surfaces.

16. The invention as claimed in claim 1 wherein said valve body includes an operating shaft, such shaft having one end extending through said cover externally thereof, said valve body including a sealing member sealingly engaging said end of said operating shaft, said sealing member including a skirt having an internal surface spaced radially outwardly from said shaft.

17. The invention as claimed in claim 16, wherein said skirt has internally threaded portions spaced apart on the interior of said skirt and said cover having a threaded portion for cooperation with said threads of said skirt.

* * * * *